(No Model.)
C. E. WYMAN.
WELL DRILLING MACHINE.
No. 457,552. Patented Aug. 11, 1891.
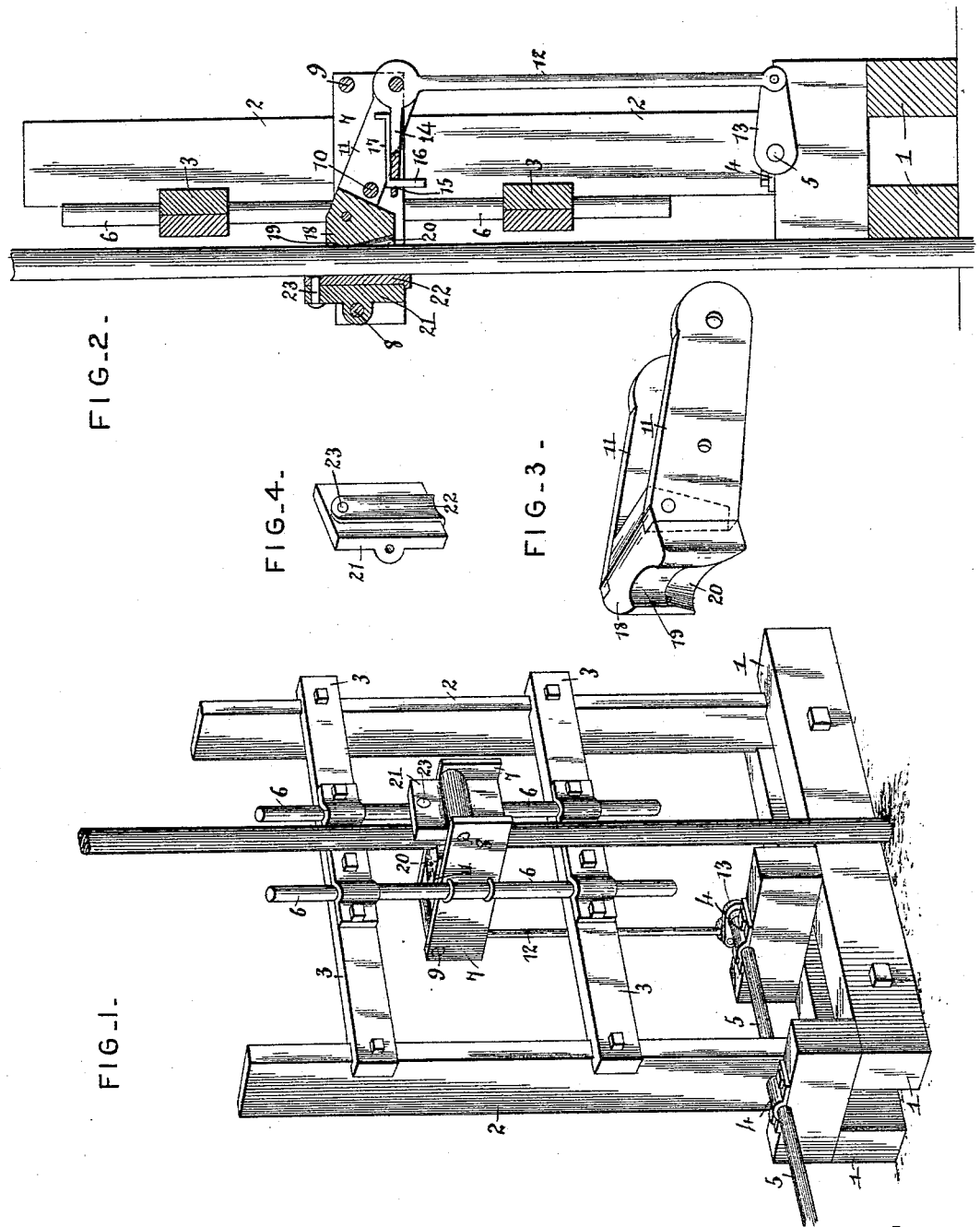
Witnesses:
Jas. K. McLathran
W. S. Duvall
Inventor
Charles E. Wyman
By his Attorneys,
C. A. Snow & Co.

UNITED STATES PATENT OFFICE.

CHARLES E. WYMAN, OF MARTINSBURG, INDIANA.

WELL-DRILLING MACHINE.

SPECIFICATION forming part of Letters Patent No. 457,552, dated August 11, 1891.

Application filed February 28, 1891. Serial No. 383,224. (No model.)

*To all whom it may concern:*

Be it known that I, CHARLES E. WYMAN, a citizen of the United States, residing at Martinsburg, in the county of Washington and State of Indiana, have invented a new and useful Well-Drilling Machine, of which the following is a specification.

This invention relates to drilling-machines of that class which are especially designed for drilling wells in rocky soil; and it has for its object to provide a machine of this class which shall be simple in construction, durable, and efficient in operation.

The invention consists in the improved construction, arrangement, and combination of parts, which will be hereinafter fully described, and particularly pointed out in the claims.

In the drawings hereto annexed, Figure 1 is a perspective view of a well-drilling machine constructed in accordance with my invention. Fig. 2 is a vertical sectional view of the same. Fig. 3 is a perspective detail view, on a larger scale, of one of the clutch members. Fig. 4 is a detail view of the other clutch member.

Like numerals of reference indicate like parts in all the figures.

The frame of my improved drilling-machine is composed, essentially, of the sills 1, upright 2, and cross-braces 3, connecting the said uprights. Boxes or bearings 4 are also mounted upon the sills 1 to support the crank-shaft 5, by means of which the machine is driven and which may receive motion in any suitable manner from any convenient source of power. The cross-braces 3 are provided on their front sides with bearings for a cross-head, which is composed of vertical rods 6, having parallel plates 7, which are connected at the front and rear ends and near the center by transverse pins or bolts, which are designated, respectively, 8, 9, and 10. Upon the latter bolt 10 is pivotally mounted a clamp 11, the rear end of which is pivotally connected with the upper end of a pitman 12, the lower end of which is connected with the crank 13 at the inner end of the shaft 12. The upper end of the pitman 12 is provided with a forwardly-extending arm 14, having a perforation 15, through which extends a pin 16, that projects downwardly from a plate or washer 17, which is in this manner mounted upon the upper side of the arm 14. Additional plates or washers may, when desired, be mounted upon the pin 16, under the plate 17, thus raising the latter for the purpose to be hereinafter set forth.

At the front end of the flange 11 is mounted one of the clutch members 18, which is composed simply of a metallic block, the front side of which has a groove 19, which is beveled or of an increased diameter at its lower end, as will be seen at 20. The other clutch member 21 is composed of a block or plate, mounted pivotally upon the bolt 8 at the front ends of the plates 7 of the cross-head and having upon its inner face a vertically-grooved wear-plate 22, which is provided with a pin 23, extending through a perforation in the clutch member 21, with which it is in this manner separably connected.

The operation of my invention will be readily understood from the foregoing description, taken in connection with the drawings hereto annexed, by those skilled in the art to which it appertains. The drill, or the rod or tube to which the drill is connected, is mounted between the clutch members in the usual manner and the crank-shaft 5 is rotated. On the upward movement of the cross-head the rear end of the crank 11, connected with the pitman, will be thrown in an upward direction, thus causing the upper front edge of the clutch member 18 to bite firmly upon the tube, which is thus carried in an upward direction. When the upward limit of the movement has been reached, the forwardly-extending arm 14 of the pitman 12 will engage the under side of the bolt 10, thus drawing the rear end of the clamp 11 in a downward direction, and consequently releasing the tool, the downward passage of which will not be obstructed, owing to the increased width or diameter of the lower end of the groove 19 in the clutch member 18. The point at which the drill shall be released may be determined or regulated by placing additional washers under the plate or washer 17, which latter is thus raised, thereby causing the drill to be released earlier on its upward passage. By properly timing the speed of the rotation of the crank-shaft 5 the clutch mechanism may be caused to catch the drill on the rebound, thus saving power and causing the machine to run very smoothly and easily and without the jerky movement which is almost invariably noticeable in this class of machines.

The general construction of the device is simple and inexpensive, and the arrangement is such that those parts of the machine which are especially exposed to wear may be easily removed at a trifling cost.

Having thus described my invention, what I claim is—

1. In a machine of the class described, the combination of the frame having vertical guides, the vertically-reciprocating cross-head mounted in the guides and having parallel suitably-connected plates, a clutch member mounted pivotally at the front end of said cross-head, a clamp mounted pivotally between the plates of said cross-head and carrying the other clutch member, and a pitman connecting the rear end of said clamp with a crank-shaft, substantially as set forth.

2. In a device of the class described, the combination of the vertically-reciprocating cross-head, the clamp mounted pivotally in the same and having a vertically-grooved block or clutch member, a plate or clutch member mounted pivotally at the front end of the cross-head, a pitman pivoted at the rear end of the clamp and having an arm extending forwardly under the latter, and a crank-shaft connected with the other end of said pitman, substantially as set forth.

3. The combination of the vertically-reciprocating cross-head, the clamp mounted pivotally in the same and having a vertically-grooved block or clutch member, the clutch member mounted pivotally at the front end of the clamp, the pitman connected pivotally with the rear end of the clamp and having an arm extending forwardly under the latter, and a plate mounted upon said arm by means of a pin extending through a perforation in the latter, substantially as and for the purpose set forth.

In testimony that I claim the foregoing as my own I have hereto affixed my signature in presence of two witnesses.

CHARLES E. WYMAN.

Witnesses:
THOMAS V. CLAXTON,
LEMUEL GRIGSBY.